Feb. 28, 1961  K. RISTAU  2,973,450
ELECTRIC DISCHARGE LAMP STARTING STRIP
Filed July 19, 1957
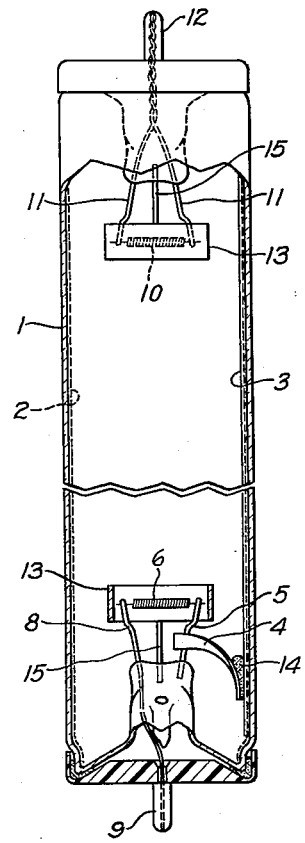
Inventor:
Käthe Ristau,
by Ernest W. Legree
Her Attorney.

2,973,450
ELECTRIC DISCHARGE LAMP STARTING STRIP

Käthe Ristau, Berlin-Zehlendorf, Germany, assignor to Patent-Treuhand-Gesellschaft für elektrische Glühlampen m.b.H.

Filed July 19, 1957, Ser. No. 672,927

Claims priority, application Germany Aug. 1, 1956

6 Claims. (Cl. 313—291)

It is well known that an electric conductor arranged between the spaced electrodes of a discharge lamp and, preferably, applied to the inner or outer wall of the lamp, e.g. in the form of a conductive wire or a conductive coating, decreases the starting voltage of the lamp. The present invention relates to a discharge lamp, more particularly a fluorescent lamp provided with an inner starting strip, and to methods of manufacturing the starting strip.

A starting strip must have good adherence to glass, mechanical strength, and in certain cases a predetermined electric resistance. It must withstand heat, cold and the surrounding atmosphere and it must be possible to apply the starting strip easily and reliably during manufacture. The use of metallic wires as inner starting strips makes it somewhat difficult to seal the stems into the lamp bulb in case of mass production. It has been already tried to apply and burn in silver pastes, e.g. with lead borate, as starting strips. Such starting strips did not meet, on the one hand, the requirements for outer starting strips principally because cracks were formed on burning which eventually led to an interruption of the conductivity of the starting strip so that the desired effect of the starting strip, viz. to reduce the starting voltage, was, in practice not obtained. On the other hand, burnt-in silver pastes cannot be used as inner starting strips because the silver amalgamates with the mercury in the lamp.

The aforesaid difficulties are, according to the present invention, overcome in such discharge lamps provided with an inner starting strip, by making the starting strip from a paste which contains a mixture of a colloidal carbon solution with a fine grained powder of non-amalgamating metal, preferably of carbonyl iron or nickel and a small quantity of polyvinyl alcohol soluble in water. By such an addition of metal powders sintering together when the igniting strip-paste is heated, sufficient strength of the starting strip is obtained. An admixture of polyvinyl alcohol soluble in water prevents, on the one hand, a decomposition of the paste during the working process and brings about, on the other hand, a decrease in the heating required for sintering. At the same time wetting of the glass is favoured. Besides, it is easier to work with aqueous solutions than with the usual organic solvents because evaporation takes place more slowly so that the starting strip can be applied in a more uniform manner.

A suitable starting strip paste may be achieved by mixing an aqueous colloidal carbon suspension with metallic powder from the group consisting of carbonyl iron and nickel and mixtures thereof, and with a polyvinyl alcohol soluble in water, in a weight proportion of approximately 200:100:1. Carbonyl iron, as is well-known, is high purity iron in the form of a very fine powder produced by the iron carbonyl process, that is by the decomposition of iron carbonyl $Fe(CO)_5$ gas at a high temperature. Similarly carbonyl nickel is high purity nickel in very fine powder form produced by the decomposition of nickel carbonyl $Ni(CO)_4$. The percentage of carbonyl iron and nickel may fluctuate by ±50%. There can be obtained with a starting strip made from such a paste having a breadth of 3 mm., and a length of 110 cm., a resistance of about 2000 ohms if a suitable thickness is chosen.

A starting strip-preparation may have, for instance, the following composition:

200 gm., of aqueous colloidal carbon suspension containing 20% carbon by weight
100 gm., of carbonyl iron
34 cc., of a 3% solution in water of a polyvinyl alcohol free from acetyl groups (=1 gm., polyvinyl alcohol) having a viscosity of 7 to 10 centipoises at 20° C.
26 cc., of distilled water.

An inner starting strip made by heat reacting such a paste brings about a decrease in starting or igniting voltage of about 35 to 40%. The inner starting strip may also be connected electrically to one of the electrodes, in which case the starting voltage is decreased by as much as 50%. For manufacturing the starting strip it is suitable to mix intimately the starting paste mixture for several hours, preferably for 20 to 30 hours in a ball mill, thereupon it is applied for instance, by means of an applicator wheel of a breadth of 0.5 to 1.5 mm., and then the starting strip is burnt-in in an air-current at about 500° C. for about 3 to 5 minutes. It is possible that during this latter process oxidation or cementation of the iron occurs, but that effect is removed by heating the tube in vacuum during subsequent manufacture. If carbonyl nickel powder is added instead of carbonyl iron then the resistance is higher by about 50% than in case of iron. After exhausting and heating the bulb up to a temperature sufficient to eliminate oxidation or cementation of the metal powder, for instance to about 450° C., the starting strip resistance remains nearly constant. A further advantage of a starting strip having the above stated composition is that it does not sputter under the influence of the glow discharge occurring on starting. The resistance of the inner starting strip amounts to about 20 ohms/cm. if the aforesaid paste composition and a wheel breadth of 1.2 mm., are used. The amount of the ohmic value may be varied from 10 to 100 ohms/cm. by changing the strip breadth, strip thickness, paste concentration, and burning temperature or time of burning.

The starting strip may be applied directly to the inner wall of the glass bulb or after coating it with fluorescent material, i.e. it may be applied over the fluorescent coating. It is, however, suitable, particularly in order to obtain a uniform decrease in starting voltage, to apply the starting strip to the finished coating of fluorescent material. After having dried the starting strip in air, it cannot be affected or dissolved either by water or by butyl acetate because the addition of polyvinyl alcohol gives a protective effect.

A springy contact sheet strip may be soldered to the starting strip to provide an electrical connection between solder strip and one electrode. A suitable solder or soldering paste contains the following ingredients:

6.5 gm., of Pb borate
5 gm., of $Ag_2O$
1.4 gm., of Zn
0.3 gm., of graphite
0.2 gm., of Al powder These ingredients are mixed as a paste with about 4 cc., of nitrocellulose to form a tough pulp which is thereupon dried, mortared and sieved. This solder paste-powder is, suitably, thereupon suspended by mixing in butyl acetate before it is used.

The accompanying drawing shows by way of example a fluorescent lamp provided with a starting strip as described in the present invention. The glass envelope has applied to it in usual manner on its inside surface a fluorescent material or phosphor 2 and has a filling of an inert starting gas such as argon at a few millimeters' pressure and a small quanity of mercury developing during normal operation a pressure of a few microns. The inner starting strip 3 is applied over this latter fluorescent material. The strip is connected at one end of the lamp by means of a springy bent sheet iron strip 4 to a support wire 5 of electrode 6, preferably by means of soldering or cementing with soldering paste 14. The other end of this electrode 6 is led out by current inlead 8 to contact pin 9, the inlead being connected to the pins by means of soldering, pinching or the like. Both ends of the other electrode 10 are connected in common to contact pin 12 by means of current inleads 11. Shields or screen caps 13 mounted on support wires 15 are arranged around both the electrodes 6 and 10 which shields are, in this embodiment, formed as flat shells open in the axial direction of the lamp toward both ends. By means of this shape and arrangement of the shields 13 there is reduced, on the one hand, blackening of the bulb due to sputtering of the emitter or of the tungsten coil respectively and, on the other hand, heating of the bulb, particularly at that place where sheet iron strip 4 is soldered to inner starting strip 3.

While the present invention has been described by reference to a specific example of same, the details of construction described are intended as exemplary and not in order to limit the invention thereto except insofar as included in the accompanying claims.

What I claim as new and desire to secure by Letters Patent of the United States is:

1. An electric discharge lamp comprising an elongated vitreous envelope provided on its inside surface with a longitudinally extending conductive starting strip formed of non-amalgamating metal from the group consisting of carbonyl iron powder, carbonyl nickel powder and mixtures thereof and having a resistance in the range of from 10 to 100 ohms per centimeter of length.

2. An electric discharge lamp comprising an elongated vitreous envelope coated internally with a fluorescent material and having a longitudinally extending starting strip applied over said fluorescent coating, said strip being formed of non-amalgamating metal from the group consisting of carbonyl iron powder and carbonyl nickel powder and mixtures thereof and having a resistance in the range of 10 to 100 ohms per centimeter of length.

3. An electric discharge lamp as in claim 2 having an electrode at each end and having a springy sheet iron strip electrically connecting the starting strip to one of the electrodes.

4. An electric discharge lamp comprising an elongated vitreous envelope coated internally with a fluorescent material and having a longitudinally extending conductive starting strip applied over said fluorescent material, said strip being formed as the heat-reaction product of a paste comprising an aqueous colloidal carbon suspension, non-amalgamating metal powder from the group consisting of carbonyl iron, carbonyl nickel and mixtures thereof, and polyvinyl alcohol mixed in a proportion of about 200:100:1 wherein the metal powder is allowed a variation of 50%.

5. The method of manufacturing an electric discharge lamp having an elongated vitreous envelope coated internally with a phosphor and provided with a longitudinally extending starting strip applied over the phosphor coating which consists in milling a mixture of an aqueous colloidal carbon suspension, a non-amalgamating metal powder from the group consisting of carbonyl iron, carbonyl nickel and mixtures thereof, and polyvinyl alcohol in a proportion of about 200:100:1 with the percentage of metal powder allowed a variation of 50%, applying said paste as a narrow strip on the inside surface of said envelope over the fluorescent coating, burning in the starting strip in air, and thereafter exhausting and heating the bulb to a temperature sufficient to eliminate oxidation and cementation of the metal powder.

6. The method defined in claim 5 wherein the burning in of the starting strip is performed in an air current at a temperature of approximately 500° C.

References Cited in the file of this patent

UNITED STATES PATENTS

| | | |
|---|---|---|
| 2,491,854 | Force | Dec. 20, 1949 |
| 2,504,498 | Clack | Apr. 18, 1950 |
| 2,627,046 | Lemmers | Jan. 27, 1953 |
| 2,654,042 | Clarke | Sept. 29, 1953 |
| 2,733,368 | Kolkman | Jan. 31, 1956 |
| 2,748,309 | Hurx | May 29, 1956 |